Patented May 28, 1929.

1,715,031

UNITED STATES PATENT OFFICE.

FRITZ GOEDECKE, OF THUSIS, SWITZERLAND.

PROCESS OF MANUFACTURING SALTS OF INOSIT HEXAPHOSPHORIC ACID.

No Drawing. Application filed November 14, 1927, Serial No. 233,305, and in Germany August 11, 1925.

My invention relates to a process of manufacturing salts of inosit hexaphosphoric acid.

Inosit hexaphosphoric acid is mainly to be found besides vitamines in seeds, roots and subterranean turions of various plants. It is believed to be a chemical individual. The method of obtaining this substance as heretofore practised disclosed in the German Patent No. 147,968 is troublesome and expensive and has before all the disadvantage that the vitamines accompanying the inosit hexaphosphoric acid are destroyed.

The object of my invention is to provide a simple, cheap and efficient process for manufacturing salts of inosit hexaphosphoric acid without any detriment to the vitamines accompanying such salts in the plants.

With this object in view my improved process consists in first extracting the suitable comminuted parts of plants rich in the salts of said acid with pure or slightly acidulated water. For acidulating the water preferably hydrochloric acid is used and the extraction preferably takes place at room temperature. The extract thus obtained consists in the main of the aqueous solution of the acid calcium and magnesium salts of the inosit hexaphosphoric acid and possibly of the free acid itself and the unchanged vitamines contained in the plants. I then separate the inosit hexaphosphoric acid in the form of salts thereof from the vitamines by adding to the extract an earth alkali metal compound capable of converting the said acid salts into neutral salts of the inosit hexaphosphoric acid, these neutral salts being practically insoluble in water. As such earth alkali metal compounds I preferably use calcium carbonate, but I may also use the neutral or basic magnesium carbonate or even calcium or magnesium hydroxide, but when using basic magnesium carbonate or calcium or magnesium hydroxide, care must be taken to avoid any clearly perceptible basic reaction in the extract, since vitamines are liable to be decomposed or destroyed in solutions showing a clearly perceptible basic reaction. Then the neutral salts of the inosit hexaphosphoric acid thus precipitated are separated by filtration from the liquid which liquid contains the vitamines in an unchanged condition and from the liquid the vitamines may be obtained by any suitable or preferred method.

The precipitated neutral salts of the inosit hexaphosphoric acid may then be purified if desired, by any suitable or preferred methods and may thus be reconverted into the acid salts by treatment with an acid, preferably oxalic acid. But possibly both, the free acid and its acid salts may result from the treatment of the precipitated neutral salts with acid.

The process of obtaining the earth alkali metal salts of the inosit hexaphosphoric acid above described is exceedingly simple, reliable, and efficient and secures a very satisfactory output, while at the same time leaving the vitamines contained in the extract in an unchanged condition, thereby a very satisfactory output in vitamines is secured. Owing to the fact that the neutral salts of the inosit hexaphosphoric acid are separated from the liquid containing the vitamines, these neutral salts may be purified and further treated by any preferred method regardless of the exceedingly high sensitivity of the vitamines to many reagents.

What I claim is:

1. A process of manufacturing salts of inosit hexaphosphoric acid comprising the extraction of comminuted parts of plants containing such acid with water, converting the said acid and its acid salts present in the extract in the form of an aqueous solution into neutral alkali earth-metal salts, practically insoluble in water, of such acid and separating the salt thus precipitated from the liquid by filtration and reconverting the salts thus precipitated into the said acid and its acid salts by treating the precipitated salts with oxalic acid.

2. A process of manufacturing salts of inosit hexaphosphoric acid comprising the extraction of comminuted parts of plants containing such acid with water, converting the said acid and its acid salts present in the extract in the form of an aqueous solution into a neutral alkali earth-metal salt, practically insoluble in water, of such acid, by treating the extract with calcium carbonate and separating the salts thus precipitated from the liquid by filtration and reconverting the calcium salt thus precipitated into the said acid and its acid calcium salt by treating it with oxalic acid.

In testimony whereof I have affixed my signature.

FRITZ GOEDECKE.